2,755,276

Δ⁴-PREGNENES AND METHOD OF PREPARING THE SAME

Seymour Bernstein and William Shardlow Allen, Pearl River, N. Y., assignors to American Cyanamid Company, New York, N. Y., a corporation of Maine No Drawing. Application March 28, 1955, Serial No. 497,473

6 Claims. (Cl. 260—239.55)

This invention relates to steroid compounds and is more particularly concerned with novel 11β,17α-dihydroxy Δ⁴-pregnene-3,20-diones, derivatives thereof and with novel processes for their production.

The novel 11β,17α-dihydroxy Δ⁴-pregnene-20-ones of the present invention may be represented by the structural formula

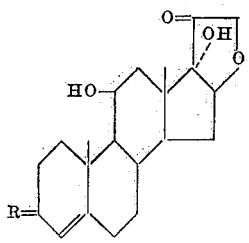

wherein R is selected from the group consisting of oxygen and dinitro-phenylhydrazino radicals.

The compounds of the present invention are preferably prepared by reacting a Δ⁵,¹⁶-pregnadiene-11β,21-diol-3,20-dione 21-alkanoate 3,20-bis-alkylene ketal with osmium tetroxide in a solvent to form the corresponding 16α,17α-dihydroxy-pregnene, forming the 16-alkylsulfonate or arylsulfonate, closing the ring by alkaline displacement and removing the protective alkylene ketal groups by hydrolysis. Removal of the alkylene ketal groups from the 3 and 20 positions can be accomplished stepwise or simultaneously as shown hereinafter in the examples.

The starting material can be Δ⁵,¹⁶-pregnadiene-11β,21-diol-3,20-dione 21-acetate 3,20-bis-ethylene ketal as described in our copending application, Serial No. 444,348, filed July 19, 1954. In place of ethylene ketal, other ketal groups can be used, such as propylene ketal. Also the hydroxyl radical in the 21 position can be reacted with other acylating agents to produce the propionate, butyrate and the like.

The process of the present invention can also be carried out by protecting the keto groups in the 3 and 20 positions of an 11-keto-17α-ol-Δ⁴-pregnene-3,20-dione-16β,21-oxide, reducing the 11-keto group to a hydroxy group and removing the protective groups by hydrolysis.

In either of the above methods the final step of removing the alkylene ketal groups is preferably carried out in alcohol in the presence of dilute mineral acid solution, such as dilute sulfuric acid solution and methanol. The reaction mixture is heated at refluxing temperatures, which are within the range of 50° C. to 125° C., for a period of from 30 minutes to 20 hours.

The compounds of the present invention exhibit glycocorticoid activity similar to hydrocortisone and are therefore useful as anti-inflammatory agents in arthritic, dermatological and ophthalmic disorders.

The following examples describe in detail the preparation of the compounds of the present invention.

Example 1

A mixture of 1.80 g. of Δ⁵,¹⁶-pregnadiene-11β,21-diol-3,20-dione 21-acetate 3,20-bis-ethylene ketal, 200 ml. of benzene, 1.3 ml. of pyridine and 1.0 g. of osmium tetroxide was allowed to stand at room temperature overnight, and then was worked up in the usual manner. Extraction with chloroform and evaporation gave a gelatinous residue which was taken up in acetone and forced out with petroleum ether. The yield of Δ⁵-pregnene-11β,16α,17α,21 - tetrol-3,20 - dione 21 - acetate 3,20 - bis-ethylene ketal was 1.74 g. (90%), melting point 200–202° C. A portion was taken up in acetone and forced out with petroleum ether changing the melting point to 189–190° C.

A mixture of 1.00 g. Δ⁵-pregnene-11β,16α,17α,21-tetrol-3,20-dione 21-acetate 3,20-bis-ethylene ketal, 25 ml. of pyridine and 0.70 ml. of methanesulfonyl chloride was allowed to stand overnight at 5° C. The cloudy solution was poured into ice water, giving a gelatinous precipitate. This mixture was extracted with chloroform and the extract evaporated to give a gel which was converted to a powder by slurrying with cold ether. A portion of this powder was treated with a hot ether slurry giving Δ⁵-pregnene-11β,16α,17α,21-tetrol-3,20-dione. 16-methanesulfonate 21-acetate 3,20-bis-ethylene ketal, melting at 169–171° C.

The Δ⁵-pregnene-11β,16α,17α,21-tetrol-3,20-dione 16-methanesulfonate 21-acetate 3,20-bis-ethylene ketal (∼1 g.) was dissolved in 20 ml. of 5% alcoholic potassium hydroxide solution and refluxed for 4 hours. The mixture was then chilled, poured into cold water and the crystals filtered off and dried. The yield was 630 mg. (79%), melting point 228°–230° C. Recrystallization from acetone-petroleum ether raised the melting point to 232–234° C.

A mixture of 0.40 g. of Δ⁵-pregnene-11β,17α-diol-3,20-dione-16β,21-oxide 3,20-bis-ethylene ketal, 20 ml. of methanol and 2 ml. of 8% (v./v.) sulfuric acid was refluxed for 1 hour. Water was added, the methanol evaporated off under reduced pressure and the crystals filtered off. The yield of Δ⁴-pregnene-11β,17α-diol-3,20-dione-16β,21-oxide-20-ethylene ketal was 160 mg., melting point 201–202° C. The water layer was extracted with chloroform, the extract evaporated to yield a hard glass which was combined with the above crystals. Crystallization from acetone-petroleum ether yielded 240 mg. (65%), melting point 213–215° C. Recrystallization from acetone-petroleum ether raised the melting point to 221–223° C.

A solution of 60 mg. of Δ⁴-pregnene-11β,17α-diol-16β,21-oxide 20-ethylene ketal in 30 ml. of methanol was refluxed with 5 ml. of 8% (v./v.) sulfuric acid for 16 hours. The mixture was then cooled, neutralized with sodium bicarbonate and the methanol evaporated under reduced pressure. The water layer was then extracted with 250 ml. of chloroform, washed 3 times with saturated saline, dried over anhydrous magnesium sulfate and evaporated to dryness. Crystallization from acetone-petroleum ether yielded 27 mg. (50%) of Δ⁴-pregnene-11β,17α-diol-3,20-dione-16β,21-oxide, melting point 219–221° C. Recrystallization from acetone-petroleum ether raised the melting point to 235–237° C.; $[\alpha]_D^{25}+8°$ (CHCl₃); ultraviolet spectrum $$\lambda_{max}^{EtOH}\ 241m\mu\ (\epsilon 15,900)$$

Example 2

A mixture of 2.78 g. of Δ⁵,¹⁶-pregnadiene-21-ol-3,11,20-trione 21-acetate 3,20-bis-ethylene ketal, 150 ml. of benzene, 1.6 ml. of pyridine and 1.5 g. of osmium tetroxide was allowed to stand at room temperature for 5 days. The osmate ester was discharged with 70 ml. of water, 20 ml. of methanol, 10.0 g. of potassium bicarbonate, 10.0 g. of sodium sulfite and stirred for 6 hours. The brown precipitate was filtered off, washed with 2 l. of hot chloroform, and the filtrates were combined. The extract was then washed 3 times with saturated saline solution, dried over anhydrous magnesium sulfate and evaporated under reduced pressure. The solid residue was slurried with acetone to give 1.79 g. of $\Delta^5$-pregnene-16α,17α,21-triol-3,11,20-trione 21-acetate 3,20-bis-ethylene ketal, melting point 266–269° C. (fraction 1). Concentration of the acetone filtrate yielded an additional 0.75 g., melting point 274–276° C. (fraction 2). (Fractions 1 plus 2=85% yield.) Recrystallization of a portion of fraction 1 raised its melting point to 274–276° C.

A mixture of 0.5 g. of $\Delta^5$-pregnene-16α,17α,21-triol-3,11,20-trione 21-acetate 3,20-bis-ethylene ketal, 0.5 ml. of methanesulfonyl chloride and 15 ml. pyridine was allowed to stand at 5° C. overnight, then poured into ice water. The crystalline precipitate was filtered off, washed with water and air dried. The yield of $\Delta^5$-pregnene-16α,17α,21-triol-3,11,20-trione 16-methanesulfonate 21-acetate 3,20-bis-ethylene ketal was 0.55 g., melting point 203–205° C. (100%). Recrystallization of a portion from acetone-petroleum ether changed the melting point to 202–203° C.

A mixture of 250 mg. of $\Delta^5$-pregnene-17α,21-diol-3,11,20-trione 16-methanesulfonate 21-acetate 3,20-bis-ethylene ketal and 20 ml. of 5% alcoholic potassium hydroxide solution was heated under reflux for 4 hours. The mixture was then poured into cold water and the crystalline material filtered off and washed with water. The yield of $\Delta^5$-pregnene-17α-ol-3,11,20-trione-16β,21-oxide 3,20-bis-ethylene ketal was 210 mg. (100+%), melting point 230–233° C. Recrystallization from acetone-petroleum ether gave material melting at 230.5–232.5° C.

A solution of 155 mg. of $\Delta^5$-pregnene-17α-ol-3,11,20-trione-16β,21-oxide 3,20-bis-ethylene ketal was dissolved in 20 ml. of tetrahydrofuran and refluxed for 4 hours with 0.5 g. of lithium aluminum hydride. The excess hydride was then discharged with a small amount of water, the inorganic precipitate filtered off and the solvent evaporated off under reduced pressure. The addition of water gave crystals which were filtered off and dried. The yield of $\Delta^5$-pregnene-11β,17α-diol-3,20-dione-16β,21-oxide 3,20-bis-ethylene ketal was 118 mg. (77%), melting point 223–225° C. Recrystallization raised the melting point to 228–231° C.

A solution of 90 mg. of $\Delta^5$-pregnene-11β,17α-diol-3,20-dione-16β,21-oxide 3,20-bis-ethylene ketal in 20 ml. methanol was refluxed for 16 hours with 7 ml. of 8% (v./v.) sulfuric acid and worked up as above. The yield of $\Delta^4$-pregnene-11β,17α-diol-3,20-dione-16β,21-oxide was 36 mg. (50%), melting point 221–224° C. Recrystallization raised the melting point to 236–238° C.

*Example 3*

A solution of 50 mg. of $\Delta^4$-pregnene-11β,17α-diol-3,20-dione-16β,21-oxide in 5 ml. of glacial acetic acid was heated for 10 minutes with 30 mg. of 2,4-dinitrophenylhydrazine, cooled and water added. The solution was extracted with 200 ml. of chloroform and the extract washed 3 times with saturated saline. Evaporation gave a red powder which was taken up in 20 ml. of chloroform and chromatographed over 20 g. of aluminum oxide. Elution with 10% acetone-chloroform gave crystals which were recrystallized from chloroform-petroleum ether. The yield of $\Delta^4$-pregnene-11β,17α-diol-3,20-dione-16β,21-oxide 3-(2,4-dinitrophenylhydrazone) was 25 mg., melting point 256° C. (d.), ultraviolet spectrum:

$\lambda_{max}^{1\% \text{ chloroform-abs. alcohol}}$ 257mμ($\epsilon$17,300); 387–8mμ($\epsilon$29,000)

We claim:

1. A compound selected from the group consisting of $\Delta^4$-pregnene-11β,17α-diol-3,20-dione - 16β,21 - oxide and $\Delta^4$-pregnene-11β,17α-diol-3,20-dione-16β,21-oxide 3-(2,4-dinitrophenylhydrazone).

2. The compound $\Delta^4$-pregnene-11β,17α-diol-3,20-dione-16β,21-oxide.

3. The compound $\Delta^4$-pregnene-11β,17α-diol-3,20-dione-16β,21-oxide 3-(2,4-dinitrophenylhydrazone).

4. A method of preparing compounds selected from the group consisting of $\Delta^4$-pregnene-11β,17α-diol-3,20-dione-16β,21-oxide and $\Delta^4$-pregnene-11β,17α-diol-3,20-dione-16β,21-oxide 3-(2,4-dinitrophenylhydrazone) which comprises heating $\Delta^5$-pregnene-11β,16α,17α,21-tetrol-3,20-dione 16-methanesulfonate 21-acetate 3,20-bis-ethylene ketal in an alkali metal hydroxide alcoholic solvent, subsequently heating the reaction product in an aqueous-alcoholic mineral acid solution and recovering said compound therefrom.

5. A method of preparing $\Delta^4$-pregnene-11β,17α-diol-3,20-dione-16β,21-oxide which comprises heating $\Delta^5$-pregnene-11β,16α,17α,21-tetrol-3,20 - dione 16 - methanesulfonate 21-acetate 3,20-bis-ethylene ketal in an alcoholic potassium hydroxide solution, subsequently heating the reaction product in an aqueous alcoholic sulfuric acid solution and recovering said compound therefrom.

6. A method of preparing $\Delta^4$-pregnene-11β,17α-diol-3,20-dione-16β,21-oxide 3 - (2,4-dinitrophenylhydrazone) which comprises heating $\Delta^5$-pregnene-11β,16α,17α,21-tetrol-3,20-dione 16-methane-sulfonate 21-acetate 3,20-bis-ethylene ketal in an alcoholic potassium hydroxide solution, subsequently heating the reaction product in an aqueous alcoholic sulfuric acid solution and recovering said product by heating with 2,4-dinitrophenylhydrazine in the presence of acetic acid.

No references cited.